United States Patent [19]

Bourgeois

[11] Patent Number: 4,549,863
[45] Date of Patent: Oct. 29, 1985

[54] PROCESS AND DEVICE FOR DEPOSITING A LABEL ON THE WALLS OF A MOLD OF AN EXTRUSION/BLOW-MOLDING MACHINE

[75] Inventor: Jacques Bourgeois, Lyons, France

[73] Assignee: Serta-Societe d'Etudes et de Realisations des Techniques d'Automatisme, France

[21] Appl. No.: 578,529

[22] Filed: Feb. 9, 1984

[30] Foreign Application Priority Data

Feb. 22, 1983 [FR] France ................. 83 03058

[51] Int. Cl.$^4$ ............................................. B65C 3/08
[52] U.S. Cl. ................. 425/126 R; 264/509; 264/511; 264/515; 264/523; 271/106; 271/107; 425/503; 425/504; 425/522
[58] Field of Search ............ 425/126 R, 121, 125, 425/233, 503, 516, 519, 520, 522, 504, 539; 264/509, 511, 515, 523; 271/14, 106, 107, 103

[56] References Cited

U.S. PATENT DOCUMENTS

| | | | |
|---|---|---|---|
| 3,292,209 | 12/1966 | Borkmann | 425/126 R |
| 4,355,967 | 10/1982 | Hellmer | 271/106 |
| 4,359,314 | 11/1982 | Hellmer | 425/522 |
| 4,397,625 | 8/1983 | Hellmer et al. | 264/509 |

FOREIGN PATENT DOCUMENTS 2657752 11/1953 Fed. Rep. of Germany .
1593056 7/1970 France .
1602216 12/1970 France .

*Primary Examiner*—Caleb Weston
*Attorney, Agent, or Firm*—Parkhurst & Oliff

[57] ABSTRACT

The invention relates to a device for introducing and positioning a label on the walls of a mold formed in two parts separated by a mold joint, in a machine with a reciprocating cycle for the extrusion/blow molding of hollow bodies, of the type comprising:—a member for storing labels disposed above the open mold,—a vertically mobile jack, disposed above the open mold, associated with means adapted to grip a label in the storage member, then to lower this label into the open mold,—means adapted to maintain the deposited label against the walls of the mold during the path of transfer of this mold, wherein a jack adapted to generate a reciprocating vertical movement is associated with a vertical rigid rod bearing at its end a rigid member adapted to pivot about this end, this pivoting rigid member comprising two rigidly connected arms, one forming a pivot stop when its abuts on the upper part of the mold, the other, vertical, bearing at its other end the label to be deposited.

5 Claims, 11 Drawing Figures

PROCESS AND DEVICE FOR DEPOSITING A LABEL ON THE WALLS OF A MOLD OF AN EXTRUSION/BLOW-MOLDING MACHINE

BACKGROUND OF THE INVENTION

The present invention relates to a device for placing a label on the walls of a mold of an extrusion/blow molding machine with a reciprocating cycle.

French Pat. No. 1 593 056 discloses a device of the type in question in which a label is placed in an open mold with the aid of an arm moving horizontally, perpendicularly to the axis of the parisons. This arrangement, on the one hand does not make it possible to act when the hollow object is still in place, this lengthening the cycle and, on the other hand, is complex to carry out and is voluminous when operating with a multi-impression mold.

In German Application No. 2 657 753, a label is carried by an arm and is brought into an open mold with the aid of a set of jacks which communicate to this arm first a vertical movement, and then a horizontal translation. During the whole passage, a suction advantageously applies the label against the label-holder and against the walls of the mold. This arrangement, which necessitates the coordination of two jacks, is complex, expensive and sometimes a source of difficulties.

SUMMARY OF THE INVENTION

It is an object of the present invention to overcome these drawbacks and, to this end, it relates to an improved device for depositing a label on the walls of the mold of an extrusion/blow-molding machine with a reciprocating cycle.

This improved device for introducing and positioning a label on the walls of a mold formed in two parts separated by a mould joint in a machine with a reciprocating cycle for the extrusion/blow molding of hollow bodies, of the type comprising:

a member for storing labels disposed above the open mold, a vertically mobile jack, disposed above the open mold, adapted to grip a label in the storage member, then to lower this label into the open mold, means adapted to maintain the deposited label against the walls of the mold during the path of transfer of this mold, is in that:

a jack adapted to generate the reciprocating vertical movement of rising and is associated with a vertical rigid rod bearing at its end a rigid member adapted to pivot about this end, this pivoting rigid member being formed by two rigidly connected arms:

one forming a pivot stop by abutting on the upper part of the mold, the other, vertical, bearing at its other end the label to be deposited.

Advantageously, in practice:

the free end of the rod fast with the jack is surrounded by a hollow mobile extension piece in which is placed a compression spring, the extension piece comprisng in its upper part at least one stop intended to limit the vertical stroke of the rod, and the pivoting rigid member is articulated on the lower end of the extension piece and is constituted by:

a first arm at the end of which is articulated a small connecting rod in turn articulated on the end of the rod of the jack; and, a second lower vertical arm connected to the first arm at the point of articulation and whose end is fixed to the labelholder;

the second vertical arm is associated with a return connecting rod parallel to this vertical arm articulated in turn on the extension piece, the two articulated return and control connecting rods then forming a quadrilateral whose lower side is associated with the labelholder.

In another embodiment, the articulations of the control connecting rod and of the return connecting rod on the extension piece lie in the same plane and the quadrilateral formed by these two parallel articulated connecting rods with the end of the extension piece and the label-holder constitutes a deformable parallelogram when the stops of the extension piece are in abutment, so that, under the effect of the compression of the spring compensating the vertical movement of the control rod, this parallelogram is deformed when moving towards the walls of the mold which are parallel to the mold joint.

The points of articulation of the control connecting rod and of the return connecting rod on the extension piece lie in two distinct, parallel, horizontal planes, with the result that, under the effect of the compression of the spring by the control rod of the jack, when the stops of the extension piece are in abutment, the quadrilateral formed by the two control and return connecting rods, the end of the extension piece and the label-holder is deformed, inclining the label-holder so as to present it parallel to the walls of the mold which are inclined with respect to the mold joint.

The label-holder is fixed to the end of the second vertical arm of the pivoting member and the label-holder is articulated on the end of the second vertical arm of the pivoting member.

BRIEF DESCRIPTION OF THE DRAWINGS

The invention will be more readily understood by reading the following description with reference to the accompanying drawings, in which:

FIG. 2 shows a simplified embodiment of the present invention with the mold open, while

DETAILED DESCRIPTION OF THE PREFERRED EMBODIMENTS

Figure 1:
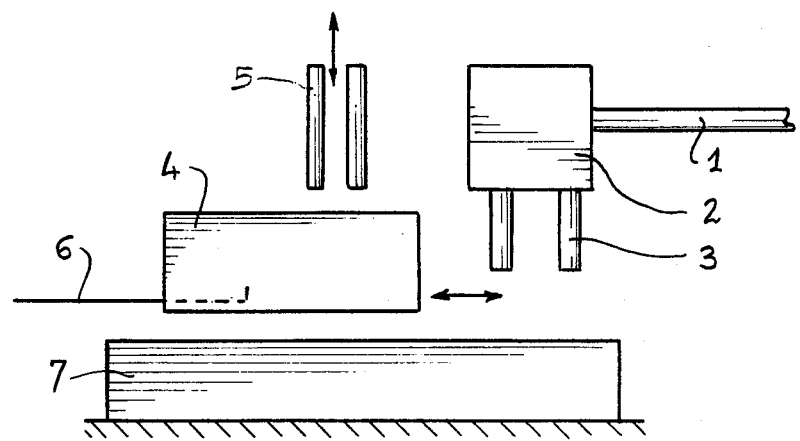
FIG. 1 is a schematic diagram showing an extrustion/blow-molding machine with a reciprocating cycle.
Figure 2:
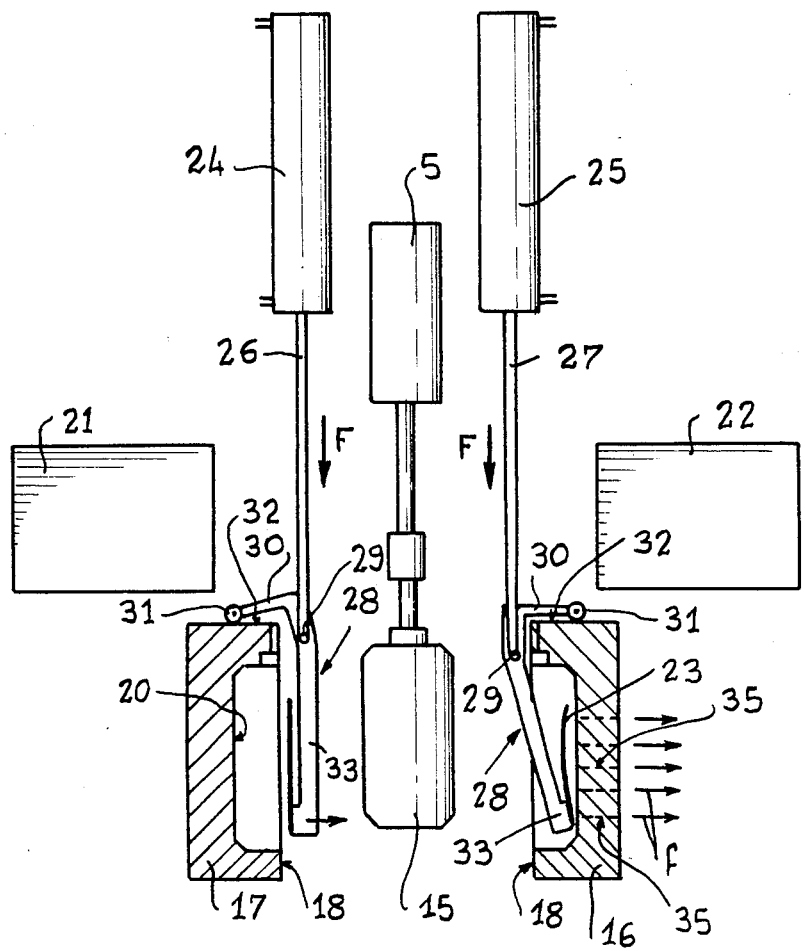

Referring now to the drawings, FIGS. 1 and 2 show an extrusion/blow molding machine with a reciprocating cycle, of the ESH10 type marketed by the Assignee of the present application. On this machine, the following references designate:

1: the extruder;

2: the extrusion head, enabling one or more parisons 3 to be formed, depending on the case;

4: the mold comprising one or more sets of similar impressions;

5: the blowing members (pipes for blowing and calibration), animated by a rising and lowering movement and connected to a sourse of gaseous fluid under pressure (not shown);

6: a fixed receiving chute adapted to receive the hollow objects formed;

7: a frame containing the members for controlling and guiding the mold-holder 4.

Figure 3:
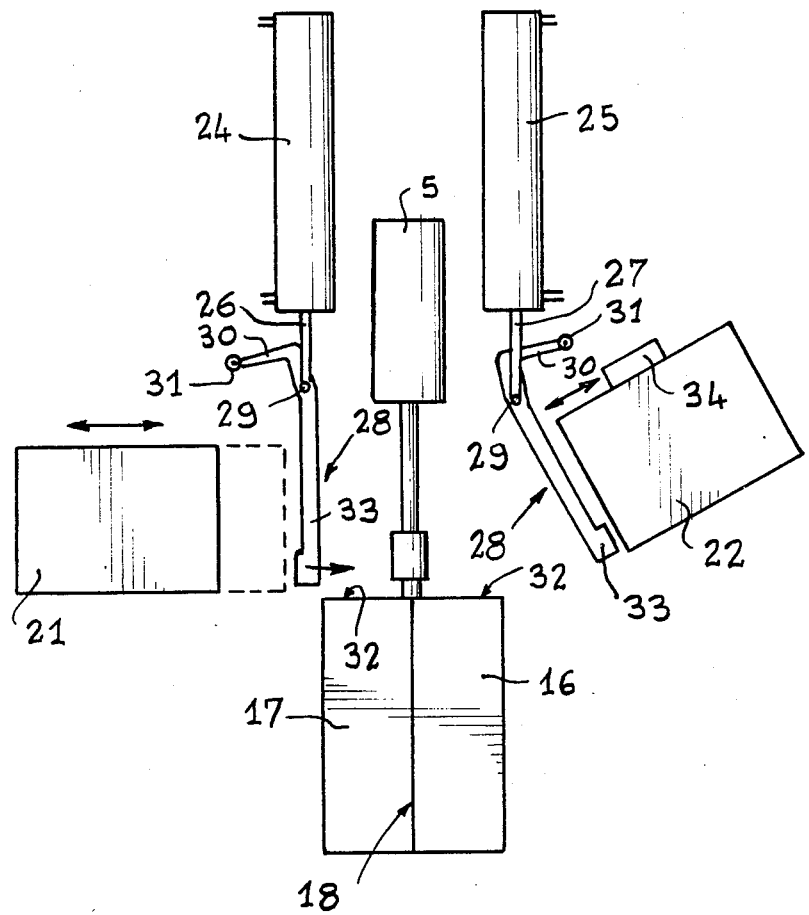
FIG. 3 shows this same installation, but with the mold closed and a label-gripping position.

In FIGS. 2 and 3, the blown hollow object, such as a bottle, is designated by reference 15. As may be seen in these Figures, the mold is formed, in a known manner, by two parts 16, 17 separated by a vertical mold joint 18. The shape of the object 15 to be reproduced is cut in the half molds 16, 17.

According to the invention, two magazines 21 and 22 are disposed either at the blowing station 5 or at the extrustion station 2, in which labels 23 are stacked in a vertical plane. In a known manner, these labels bear on one side an appropriate design and on the other side a heat-meltable material conventional for this application.

Opposite the magazine 21 and 22 are placed two vertically mobile, parallel jacks 24, 25, for example large-stroke pneumatic jacks, at the end of which are connected two rigid rods 26, 27 which will therefore be animated by a rising and lowering movement. The opposite end of these rigid rods 26, 27 comprises a rigid member 28 pivoting at the end 29 of each rod.

This characteristic pivoting rigid member 28 is generally in the form of an L or boomerang and essentially formed by two elementary arms:

the first elementary arm 30, is essentially horizontal, and presents at its free end a stop 31 adapted to abut on the upper face 32 of the half-mold, 16 or 17;

the second elementary arm 33 is essentially vertical and bears at its end the label 23 to be deposited.

By appropriate means such as suction, the label 23 is maintained in position during the entire transfer operation. The left-hand part of FIG. 2 shows the descent of the jack in the open half-mold 17, while the right-hand part illustrates the deposit of the label 23 on the other half-mold 16.

FIG. 3 shows the manner in which the label may be gripped. The left-hand part of FIG. 3 shows by convenience a label grip by displacement of the magazine 21 in a horizontal plane, while, in the right-hand part, the label-holder or magazine 22 is fixed but inclined and the arm 33 is associated with a jack 34 which makes it possible to grip the first label presented in the magazine 22, on the printed face side.

When the vertical arm 33 comes in front of the label-holder 21 with the aid of an appropriate member, the suction means suck the label to be deposited. It will be noted that, in this case, the mold 16, 17 is in closed position.

Simultaneously, the mold 4 formed by two closed parts 16, 17 containing the parison 3 is brought to the blowing and cooling station 5. After the blown form 15 has been stripped and while the mold, and more precisely the two parts of the mold 16, 17 are open in order to ensure transfer between the station for ejection of the blown hollow body and before formation of the parison in 2, the mold is maintained in a stationary position below the two vertically mobile jacks 24, 25. At that moment, the two jacks descend vertically in the direction indicated by arrow F in FIG. 2. In this way, the label-holder arm 33 descends. During this transfer, the suction exerted through the walls of the arm 33 maintains the label 23 applied against the outer face of the label-holder 21. The arm 33 then penetrates in the gap between the two half-mold 16, 17 in a direction parallel to the mold joint 18.

When the label-holder arm 33 arrives substantially at the end of its stroke, the stop 31 placed at the end of the essentially horizontal arm 30 abuts on the upper face 32 of the corresponding half mold 16, 17. By pivoting about the pivot pin 29 placed at the end of the rigid rods 26, 27 associated with the jacks 24, 25, the label-holder 33 is pivoted towards the inside of the mould and more precisely towards the wall 20. At that moment, by a conventional device (not shown), the suction in the arm 33 is cut off and, another suction is created in the direction indicated by the small arrows f through conventional appropriate orifices 35 provided in the wall 20 of the half-mold 16, 17. The label 23 is then sucked and is applied more precisely by its printed face against the wall 20 of the half-mold (FIG. 2).

The jacks 24, 25 are then raised again. The open mold may then be transferred. When the two still-open half molds arrive at the extrusion station 2, they close in order to grip the following parison 3.

The cycle then begins again.

In this way, due to the reciprocating movement of the rigid rods 26, 27, this movement is converted by the stop 31 into a pivot with a component of translation which places the label in the vicinity of the wall.

Figure 4:
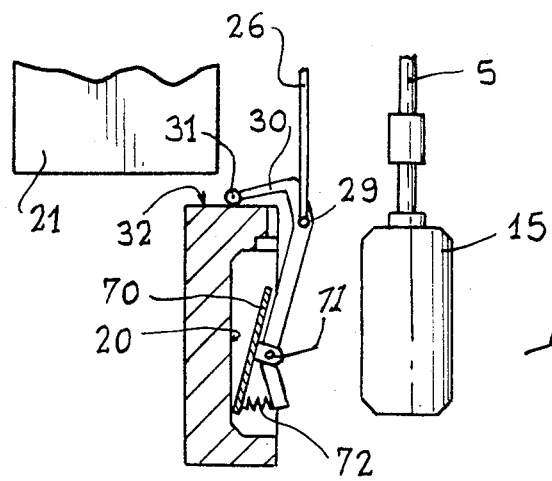
FIGS. 4 to 6 show in detail the end of a jack rod in a variant embodiment of the preceding device, respectively in vertical position (FIG. 4), in position applied against the wall (FIG. 5) and in position also applied, but with a specially shaped shoe (FIG. 6).
Figure 5:
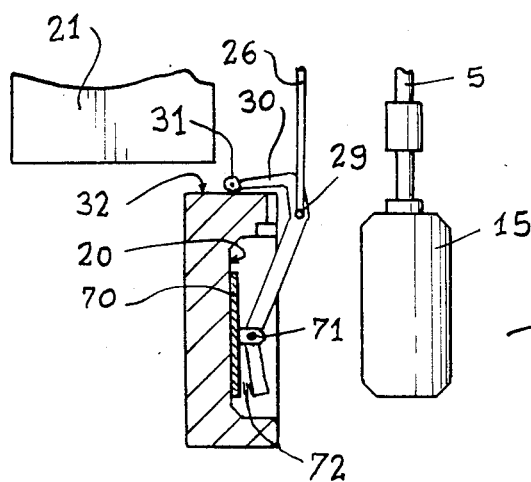
Figure 6:
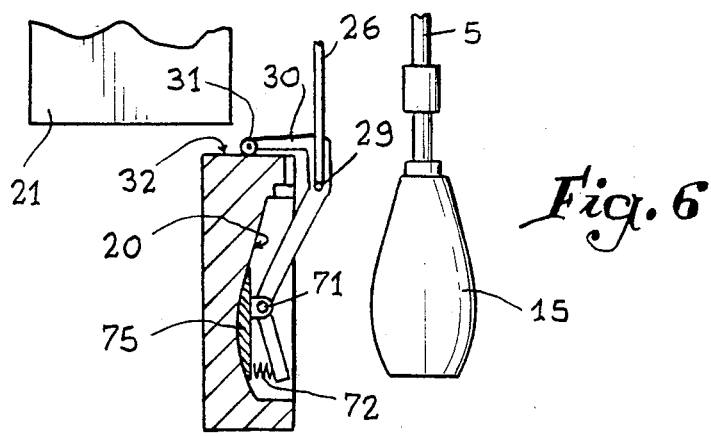

In a preferred embodiment shown in FIGS. 4 to 6, the end of the arm 33 comprises a vertical shoe 70 articulated at 71 on the end of the arm 33. This shoe 70 is maintained in abutment on arm 33 by a return spring 72 (FIG. 4). When the stop 31 abuts on the top of the mold 32 (Fig. 5), it causes the arm 33 and consequently the shoe 70 to pivot, the shoe 70 then abutting the wall 20 and being maintained vertically against this wall 20 while the label is being deposited. In a variant embodiment (FIG. 6), the shoe 75 has an external shape complementary to that of the wall 20, which facilitates transfer of the label.

Figure 8:
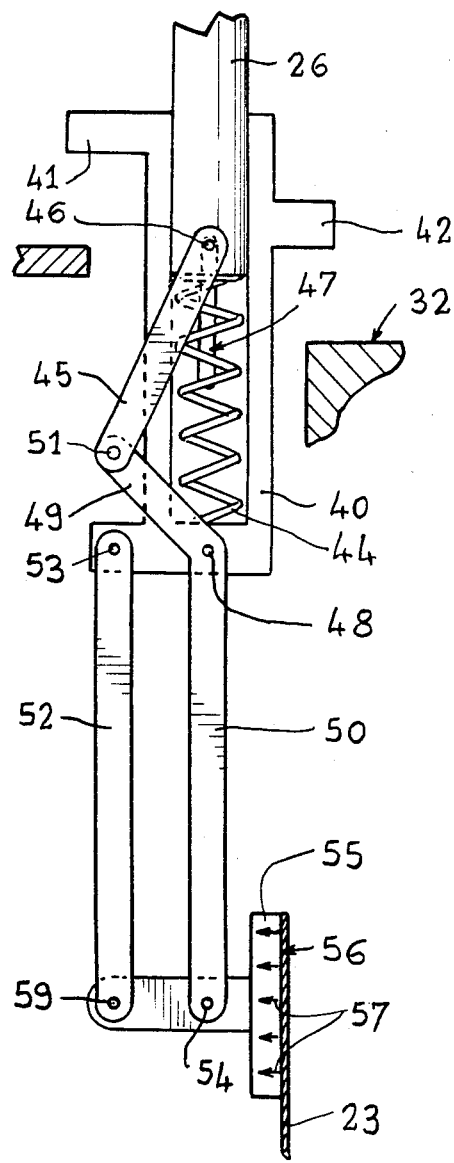
FIGS. 8 and 9 show an embodiment of a device according to the present invention adapted to deposit large labels and in which the walls of the mold are parallel to the mold joint.
Figure 9:
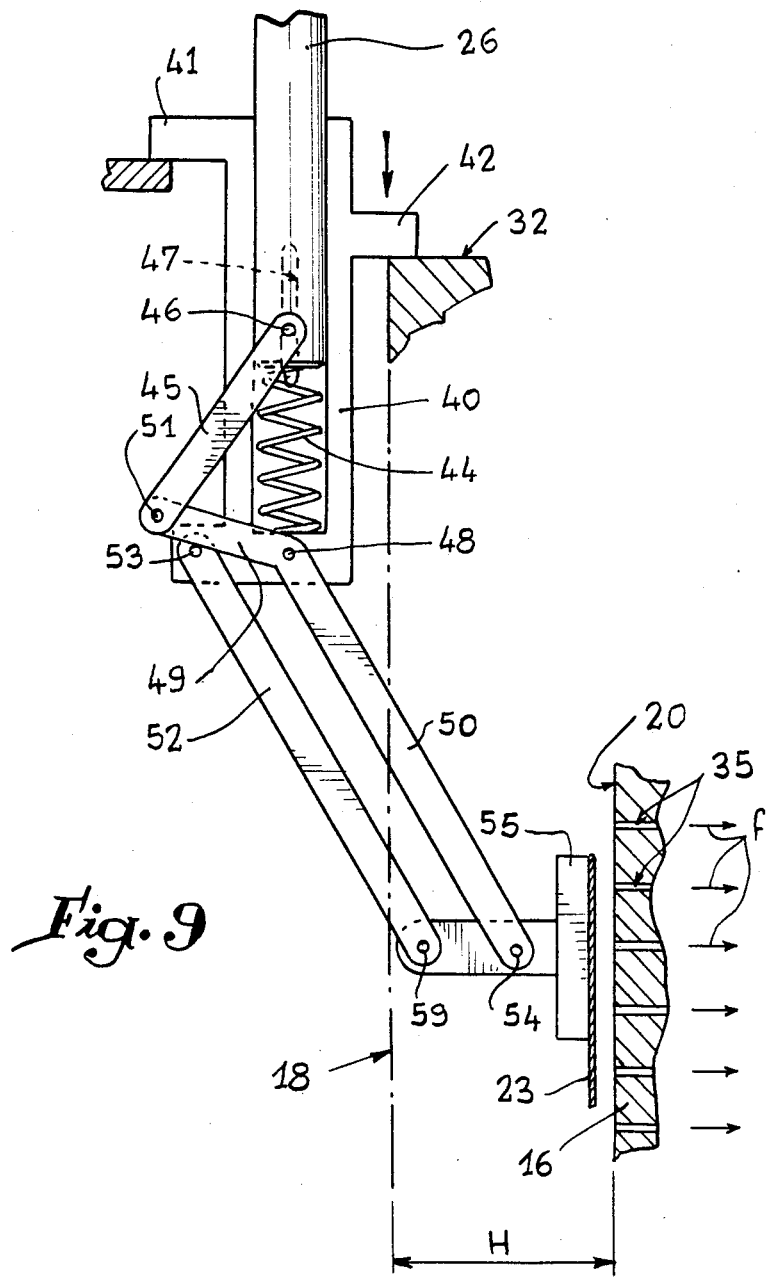

FIGS. 8 and 9 show a preferred embodiment of the present invention, which is adapted to deposit large labels on a wall parallel to the mold joint 18.

In this embodiment, the rigid rod 26 associated with the jack presents at its end an extension piece 40 which comprises:

at the top, stops 41, 42 adapted to abut either on the blowpipe support or on the top of the mold 32;

at the bottom, an assembly of connecting rods which are described in detail below.

The stops 41, 42 may be associated with screws adapted to adjust the simultaneous contact between the right- and left-hand sides and if necessary to make up for divergences.

The interior of the extension piece 40 is hollow so as to allow sliding of the end of the rod 26 and to receive a compression spring 44. On the end of the rod 26 is articulated a small connecting rod 45 of which the point of articulation 46 may moreover move in a slot 47. In alignment with the rod 26, the mobile extension piece 40 presents a pivot pin 48 about which is articulated a rigid member generally in the form of an inclined L or V or a boomerang formed by an upper arm 49 and a substantially vertical lower arm 50. The small connecting rod 45 is articulated at 51 on the end of the upper arm 49. The assembly 49, 50 is rigid and therefore articulated about pin 48. A return connecting rod 52 is articulated at 53 on the end of the extension piece and is disposed parallel to the vertical arm 50 which forms control connecting rod. The ends of these two connecting rods 50 and 52 are articulated at 59, 54 on a member 55 adapted to bear and receive the label 23. The label 23 is applied against the face 56 of the label-holder 55 with the aid of suction orifices 57 connected to a source of vacuum (not shown).

As has already been stated above, suction enables the label-holder member 55 to grip the label in the appropriate magazine 21 or 22, to hold it during descent of the rods 26, 27 and to present the label opposite the wall of the mold, until this suction 57 is cut off and reversed on the suction orifices 35 also pierced in the walls of the mold. Cut-off of the vacuum connected to the orifices 57–35 is effected automatically, as soon as the label-holder 55 is located opposite the wall 20 where the label 23 to be deposited must be transferred.

When the rod 26 arrives at the end of its stroke, it first compresses the spring 44 then, due to the end-of-stroke clearance provided by the slot 47, compresses the connecting rod 45 which, in turn, causes the control connecting rod 50 to pivot and drives the parallel return connecting rod 52. A deformable parallelogram defined by 48-54-59-53 is thus formed. Consequently, during the movement of transfer of the label-holder in the horizontal plane represented by letter H, the label 23 is maintained parallel to the mold joint 18 and is therefore presented parallel to the wall 20 which is adapted to receive the label.

Figure 10:
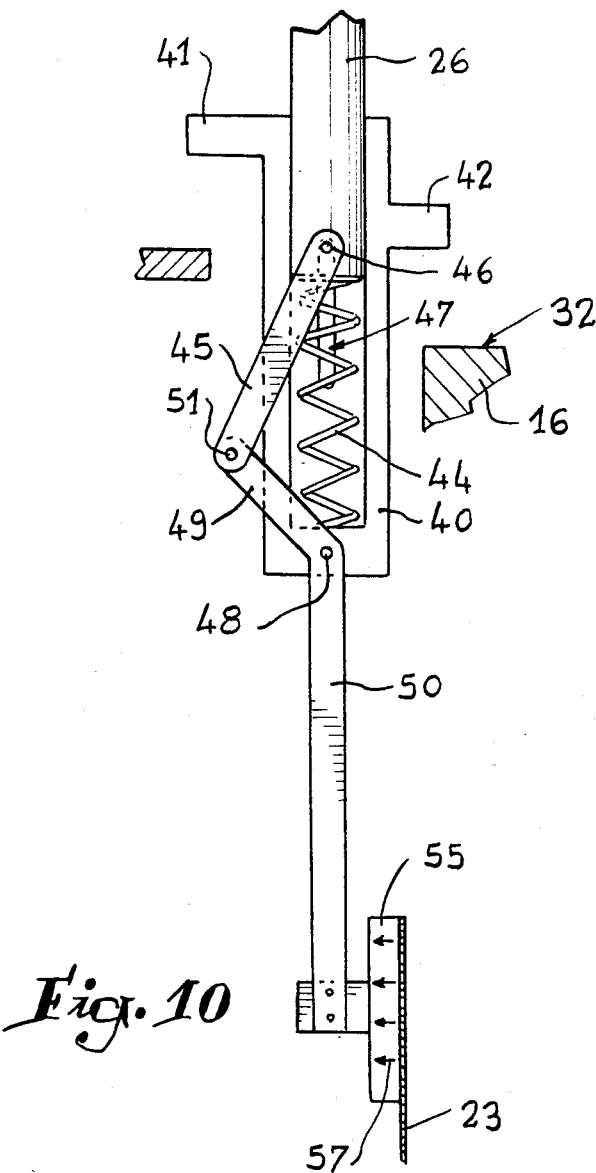
FIGS. 10 and 11 show a preferred embodiment of the present invention which is adapted to deposit small labels.
Figure 11:
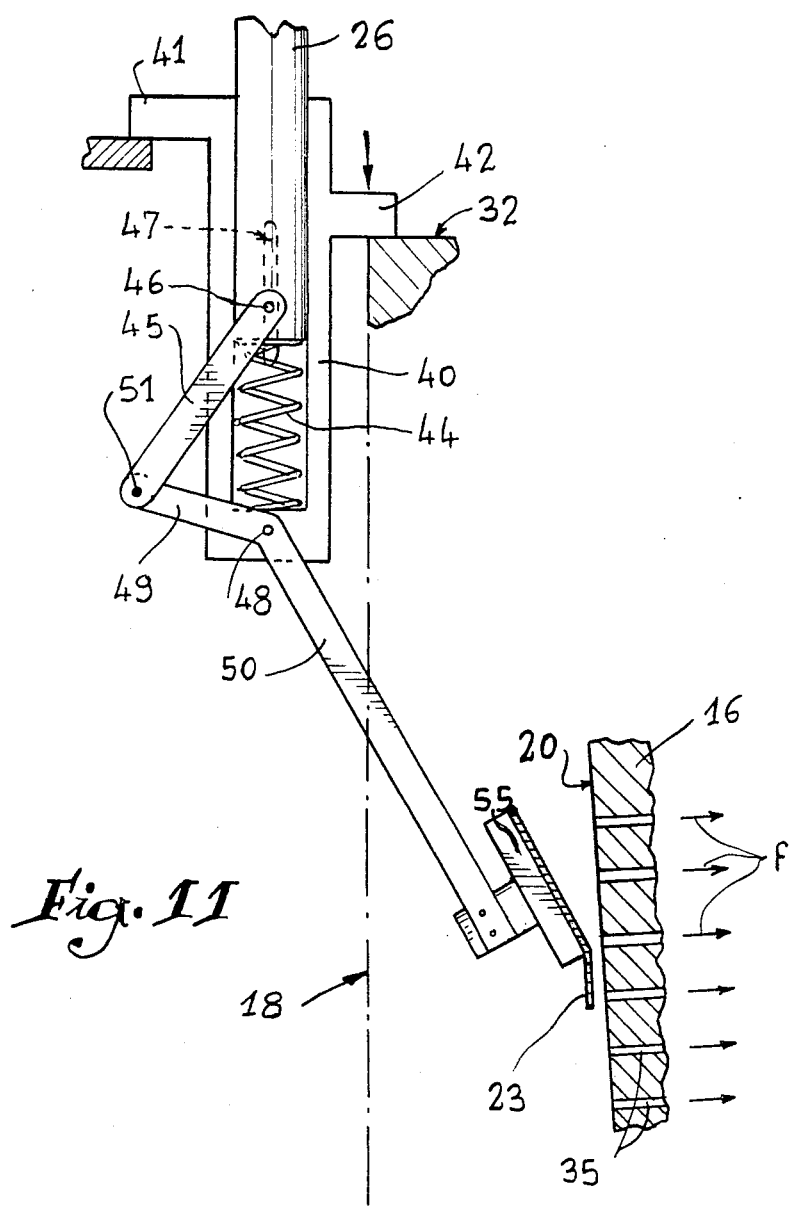

FIGS. 10 and 11 show another preferred embodiment of the present invention. Here, the rigid pivoting member is similar to that of the preceding example, but is simplified. In fact, it comprises only one pivoting assembly 49, 50 articulated at 48 on the end of the extension piece 40. The label-holder 55 is rigidly fixed to the end of the vertical arm 50.

In a variation thereof the label-holder 55 may be mounted to pivot with a return spring, as in the embodiment shown in FIGS. 4, 5 and 6.

As before, the label is deposited during idle time, either at the ejection station or at the extrusion station. This supplementary step in which the open mold is stopped to allow the label to be deposited lasts as short a time as possible. By way of indication, durations of between one second and one and a half seconds are generally sufficient.

Figure 7:
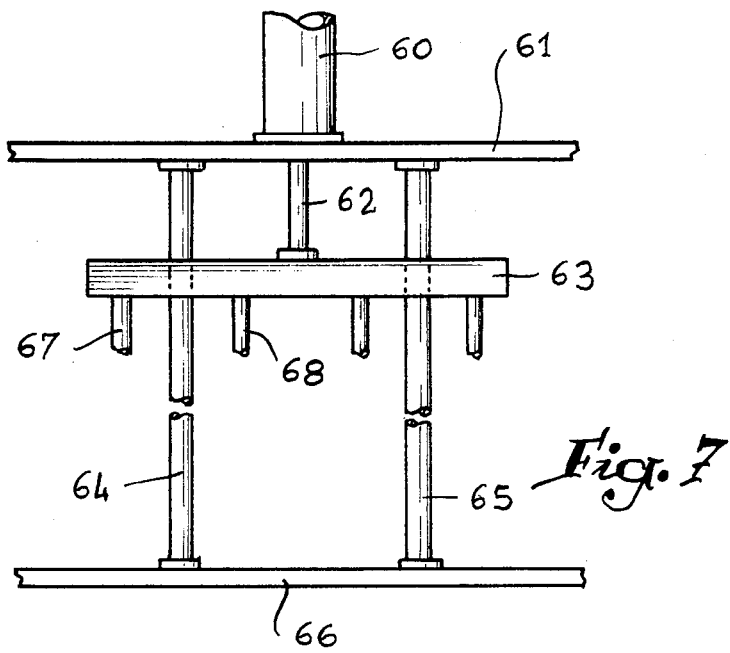
FIG. 7 shows a detail of an embodiment for a multi-impression mold.

When the mold comprises a plurality of impressions as in FIG. 7, a jack 60 is fixed on a fixed plate 61 of the frame. A vertical rigid rod 62, similar to 26, fast with the jack 60 is associated with an intermediate piece 63 which slides along two vertical columns 64, 65 connected to a second rigidifying plate 66 fixed on the frame. This intermediate plate 63 bears extension arms 67, 68 similar to 40, in a number corresponding to that of the impressions. In this way, one sole jack 60 makes it possible to control a plurality of pivoting members and consequently to ensure simultaneous deposit of a plurality of labels in a multi-impression mold.

The device according to the present invention offers numerous advantages over known devices. For example:

mechanical simplicity and reliability, possibility of depositing the labels in multi-impression molds, even when the blown hollow body is present.

Consequently, the invention may receive numerous applications in the extrusion/blow-molding machines with a reciprocating cycle, whether the latter incorporate mono- or even preferably multi-impressions.

What is claimed is:

1. A device for introducing and positioning a label on the walls of a mold formed in two parts separated by a mold joint in a machine with a reciprocating cycle for the extrusion blow-molding of hollow bodies, comprising:
   (a) a storage member for storing labels, said storage member being disposed above said mold;
   (b) a reciprocating vertically mobile jack disposed above said mold;
   (c) a vertical rigid rod, a first end of said vertical rigid rod being connected to said jack, a second end of said vertical rigid rod being surrounded by a hollow mobile extension piece containing a compression spring, said extension piece comprising at its upper end at least one stop, said stop limiting the vertical stroke of said vertical rigid rod by abutting on an upper portion of said mold or on a blowpipe-holder member;
   (d) a rigid pivoting member being connected to a lower end of said extension piece and comprising an upper arm and a lower arm, said lower arm being fixed to a label-holder;
   (e) a connecting rod, a first end of said connecting rod being connected to said upper arm of said rigid pivoting member, a second end of said connecting rod being connected to said second end of said vertical rigid rod; and
   (f) means for maintaining a label against a wall of said mold;

wherein said label-holder is adapted to grip a label in said storage member and lower said label into said mold.

2. The device of claim 1, wherein said rigid pivoting member is in the form of a boomerang.

3. The device of claim 2, further comprising a return connecting rod, said return connecting rod being parallel to said lower arm of said rigid pivoting member, a first end of said return connecting rod being connected to said lower end of said extension piece, a second end of said return connecting rod being connected to said label-holder, said return connecting rod, said lower arm of said rigid pivoting member, said lower end of said extension piece and said label-holder forming quadrilateral, wherein said quadrilateral is deformable when said at least one stop of said extension piece abuts said upper portion of said mold or said blowpipe-holder member and said vertical rigid rod compresses said compression spring.

4. The device of claim 1, wherein the said mold comprises a plurality of impressions.

5. The device of claim 1 further comprising, a return spring disposed between said lower arm of said rigid pivoting member and said label-holder.

* * * * *